J. A. WHITNEY.
Refrigerating Apparatus.
No. 219,131. Patented Sept. 2, 1879.
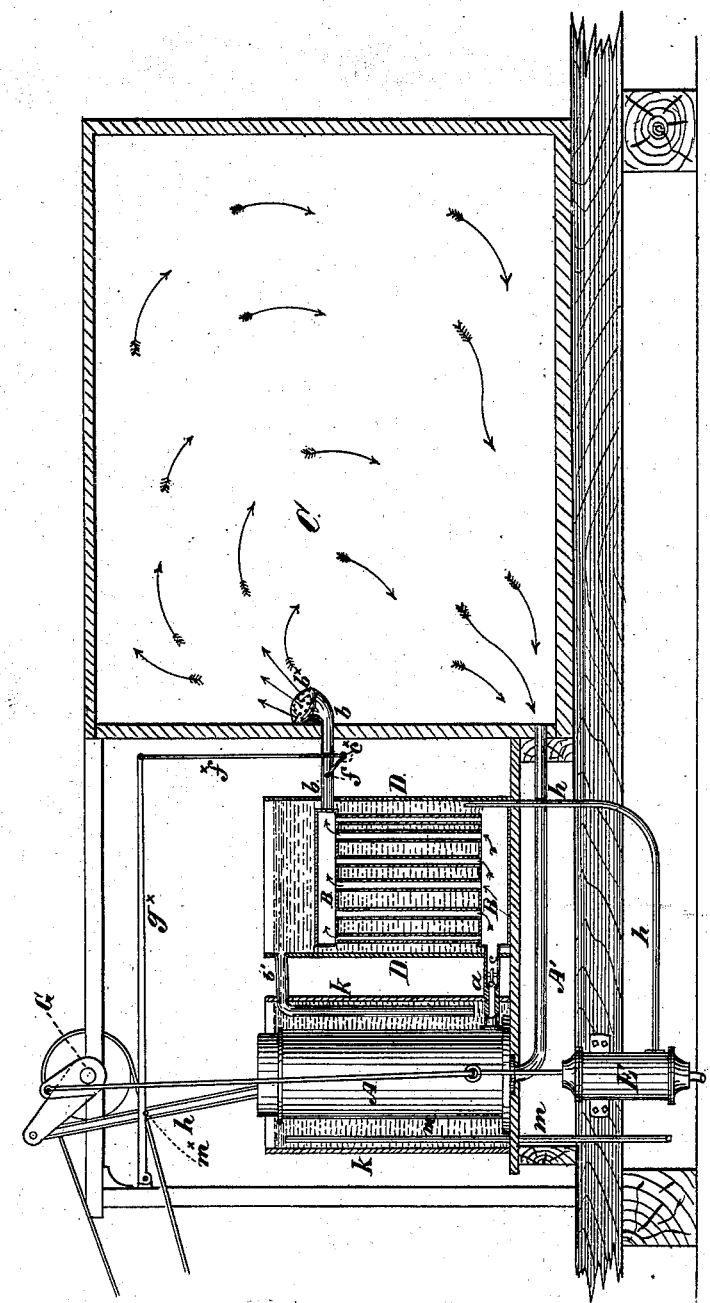
Witnesses:
Henry Eichling
Edward Holly
Inventor:
James A Whitney

UNITED STATES PATENT OFFICE

JAMES A. WHITNEY, OF NEW YORK, N. Y.

IMPROVEMENT IN REFRIGERATING APPARATUS.

Specification forming part of Letters Patent No. 219,131, dated September 2, 1879; application filed May 24, 1877.

*To all whom it may concern:*

Be it known that I, JAMES A. WHITNEY, of the city, county, and State of New York, have invented certain Improvements in Refrigerating Apparatus, of which the following is a specification.

This invention relates to the preservation of meats, vegetables, fruits, &c., by means of air artificially cooled by first subjecting it to compression, then eliminating or absorbing the heat evolved or made sensible by such compression, and subsequently permitting the air to expand, my said invention being designed to provide for the effective and economical utilization for such purposes of air thus cooled.

I am aware that numerous plans have hitherto been proposed with a like object; but in all of them the expanded cooled air has been injected into or through the place to be cooled in a single jet or stream; but it is inevitable in all such cases that the cold-air current or stream follows a single narrow course without affecting the temperature or condition of the air outside of its own line of movement, no provision having been hitherto made to disseminate or distribute the air cooled, as hereinbefore indicated, to different parts of the provision-chamber or chill-room, and as a consequence the temperature outside of the direct path of the cold-air stream remains unaffected, so that meats or other perishable articles of food placed at the lateral or more remote parts of the provision-chamber or chill-room become deteriorated or worthless.

The principal object of my said invention is to obviate the drawback referred to, and thereby to render commercially and practically available the use of air thus cooled for the preservation of meat and other perishable articles of food.

My said invention comprises the combination, in an apparatus for preserving perishable articles of food, of an air-compressor, a compressed-air reservoir, a closed provision-chamber or chill-room, and a distributer for insuring the passage or distribution of the cooled air to different parts of the provision-chamber or chill-room, whereby the conditions essential to the preservation of perishable articles of food are effectually secured.

My said invention also comprises a novel combination of a water-jacketed air-compressor, a water-jacketed compressed-air reservoir, a closed provision-chamber or chill-room, a pipe connecting the provision-chamber or chill-room with the compressed-air reservoir, a pipe connecting the provision-chamber or chill-room with the air-compressor, a pipe connecting the air-compressor with the compressed-air reservoir, and a pump for circulating the water around the compressor and the reservoir, the whole constructed and arranged to provide for the effective compression and cooling of the air intended to be used for purposes of refrigeration.

The drawing represents a vertical sectional view of a refrigerating apparatus constructed for operation according to my invention.

As represented in the drawing, the air-compressing apparatus is provided with an air-compressing pump, A, the inlet-pipe $A'$ of which connects with the interior of the provision-chamber or chill-room C, which latter, when the apparatus is in use, is practically closed against access of the external atmosphere. The outlet-pipe $a$ of this air-forcing pump A is connected with the tubular reservoir B, into which the air from the pump A is compressed, the pipe $a$ having a valve, $c$, to prevent the reflux of the air from the reservoir to the pump during the reverse movement of the piston of the latter. The reservoir B communicates by an outlet-pipe, $b$, with the interior of the provision-chamber or chill-room C. In the pipe $b$ is placed a valve or cock, (indicated at $f$,) of any suitable kind, and operated as hereinafter explained, and which, by closing or diminishing to any required extent the outflow of the air from the compressing apparatus to the provision-chamber or chill-room, insures the proper retention of the air under compression for a sufficient length of time to permit or insure the requisite elimination or absorption of the heat evolved. The end of the pipe $b$, communicating with the provision-chamber or chill-room C, is provided with a distributer for directing or causing the passage of the cooled air to different parts of the provision-chamber or chill-room, which distributer may consist of a bulb, $b^\times$, the openings in which are divergent to each other, so that as the air issues under pressure from the pipe $b$ through this distributer $b^\times$ it is divided into a number of currents, which are directed toward different parts of the provision-chamber or chill-room, so that the air shall be caused to circulate throughout the said provision-chamber or chill-room instead of being limited in its movement to any particular part thereof.

In lieu of the bulb with its divergent openings, mechanical equivalents of said device may be employed to insure the desired distribution of the cooled air—as, for example, a perforated pipe or pipes of any desired length extended into or around the provision-chamber or chill-room may be used, or a system of pipes having ends opening at different parts of said chamber or room may be used, the *modus operandi* or function and purpose being the same in either case.

The reservoir B is surrounded by a water-tank, D, through which water at an ordinary or suitably low temperature is caused to flow. This water surrounding the tubes of the reservoir B, and in contact therewith, rapidly absorbs the heat evolved from the air under compression in the said reservoir, so that when the air is liberated and caused to expand to and within the provision-chamber or chill-room C its temperature is reduced in due ratio. This water-supply in the compressing apparatus, as represented in the drawing, is secured by means of a pump, E, which may be actuated from the same driving-shaft, G, that operates the air-compressing pump A. The pump E draws its water from any suitable source of water-supply—on shipboard from the sea itself. On land, where a suitable head of water may be obtained, such head of water may be substituted for the pump E.

The water passes from the pump E, through the pipe $h$, into the lower part of the tank D, and out from the upper part of the latter, through a pipe, $b'$, into a water-jacket, $k$, provided around the barrel of the air-forcing pump A, the water then making its exit through the waste-pipe $m$. The office of the water-jacket around the air-forcing pump A is to prevent the undue heating of the pump by the heat evolved from the air compressed within it, and also in a measure to assist the water in the tank D around the reservoir B in the elimination or absorption of the heat evolved from the air by compression, as hereinbefore specified.

The valve or cock $f$ in the outlet-pipe $b$ of the receiver B is provided with an arm or lever, $c^\times$, by means of which the valve may be opened or closed, either wholly or in part—for example, closed to retain the air under compression in the reservoir B, opened to permit the ejectment of the air from the reservoir into the provision-chamber or chill-room C, or partially closed, if such should be found expedient, to permit the outflow of air from the reservoir B to the provision-chamber or chill-room C, in such ratio as to still secure the proper compression of the air in the reservoir without interrupting the passage of air from the reservoir to the provision-chamber or chill-room. The outer extremity of the arm $c^\times$ is connected by a rod, $f^\times$, to the free end of a lever, $g^\times$, the pitman or connecting-rod $h$ of which actuates the piston of the air-compressing pump A, and is provided with a laterally-projecting stud or pin, $m^\times$, which, when the piston of the said air-forcing pump A has nearly reached the limit of its upward stroke, strikes the under side of the lever $g^\times$, and, lifting the same, actuates the arm $c^\times$ of the valve or cock $f$ to open the pipe $b$ and permit the ejectment of the compressed air from the reservoir B into the provision-chamber or chill-room C, the lever being of sufficient weight or otherwise sufficiently loaded to insure a reverse movement of the arm $c^\times$ on the descent of the piston of the air-forcing pump A, thereby turning the valve or cock $f$ to close the pipe $b$ while air is being again compressed into the reservoir B.

The operation of the invention is, therefore, in brief, as follows: A portion of the air contained within the provision-chamber or chill-room C is drawn therefrom, through the pipe A′, into the air-forcing pump A, and then forced by the latter, through the pipe $a$, into the reservoir B, the cock or valve $f$ being in position to close the pipe $b$. In the meantime the water flowing through the tank D absorbs, through the walls of the reservoir B, the heat evolved by the compression of the air in the said reservoir, the air being held under compression in the reservoir during the greater portion of the upward stroke of the piston of the pump A. The lever $g^\times$, being then lifted, as hereinbefore explained, operates the valve $f$ to open the pipe $b$, thereby permitting the compressed air from which the heat has been evolved and absorbed, as hereinbefore explained, to pass into and expand within the provision-chamber or chill-room C, the air, as thus expanded, being, of course, reduced in temperature, and the said air, as it issues through the pipe $b$ into the provision-chamber or chill-room C, through the distributer $b^\times$ of the pipe $b$, being directed to different parts of the said provision-chamber or chill-room C. The air contained within the provision-chamber or chill-room C is caused in this manner to pass repeatedly through the apparatus for compressing the air and eliminating or absorbing the heat evolved by such compression, and being thus repeatedly subjected to said operation it is reduced to and maintained at any required degree of temperature necessary in the preservation or storage of perishable articles of food. The degree of this temperature may, moreover, be regulated by simply regulating the speed at which the air-compressing apparatus is made to work, and also by regulating the temperature of the heat-absorbing medium provided to absorb the heat evolved from the air in its compressed condition.

It is to be understood that while I prefer water flowing in contact with the apparatus in which the air is compressed for the purpose of removing the evolved heat, yet any other means which will remove the heat evolved from the air under compression will, so far as concerns my invention, be simply an equivalent for the water flowing in contact with said air-compressing apparatus.

It is to be understood that, in the automatic operation of the cock or valve $f$, any suitable mechanism for giving movement to said valve at proper intervals and in proper unison with the working of the air-compressing pump may be substituted for that shown in the drawing.

It is also to be understood that while the tubular reservoir B possesses advantages not inherent in any other construction of air-compressing apparatus, yet, so far as concerns certain features of my invention, air-compressing devices of different construction may be employed.

It is also to be understood that the arrangement of the pipe $b$ and the pipe provided by the pipe A', both of which pipes $b$ A' connect with the provision-chamber or chill-room C, is such that the air passing into the provision-chamber or chill-room C and thence again to the pipe A' is caused to circulate through said provision-chamber or chill-room over and over again.

In order to maintain the contained air at the requisite degree of dryness, there may be placed within the provision-chamber or chill-room an open vessel containing chloride of calcium or other substance capable of absorbing the surplus moisture from the air.

What I claim as my invention is—

1. In an apparatus for preserving perishable articles of food, the combination of an air-compressor, a compressed-air reservoir, a closed provision-chamber or chill-room, and a distributer for directing the cooled air to different parts of the chamber or room, substantially as and for the purpose herein set forth.

2. In an apparatus for preserving perishable articles of food, the combination of the following elements, to wit: a water-jacketed air-compressor, a water-jacketed compressed-air reservoir, a closed provision-chamber or chill-room, a pipe connecting the provision-chamber or chill-room with the compressed-air reservoir, a pipe connecting the provision-chamber or chill-room with the air-compressor, a pipe connecting the air-compressor with the compressed-air reservoir, and a pump for circulating the water around the compressor and the reservoir, substantially as and for the purpose herein set forth.

JAMES A. WHITNEY.

Witnesses:
 EDWARD HOLLY,
 H. WELLS, Jr.